(12) United States Patent
Kawasaki et al.

(10) Patent No.: US 7,267,626 B2
(45) Date of Patent: Sep. 11, 2007

(54) AUTO TENSIONER

(75) Inventors: Kanji Kawasaki, Osaka (JP); Takashi Sumida, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 593 days.

(21) Appl. No.: 10/492,236

(22) PCT Filed: Oct. 18, 2002

(86) PCT No.: PCT/JP02/10858

§ 371 (c)(1),
(2), (4) Date: Apr. 7, 2004

(87) PCT Pub. No.: WO03/036131

PCT Pub. Date: May 1, 2003

(65) Prior Publication Data
US 2004/0235598 A1    Nov. 25, 2004

(30) Foreign Application Priority Data
Oct. 19, 2001    (JP) ............................. 2001-321698

(51) Int. Cl.
*F16H 7/08*    (2006.01)
*F16H 7/22*    (2006.01)
(52) U.S. Cl. .................... 474/135; 474/109; 474/133
(58) Field of Classification Search ............... 474/101, 474/112, 133–138, 113–117; 384/202, 220, 384/271–273; 267/151–153, 292
See application file for complete search history.

(56) References Cited

U.S. PATENT DOCUMENTS

| | | | |
|---|---|---|---|
| 5,351,940 A | 10/1994 | Yano et al. | |
| 6,004,235 A | 12/1999 | Ohta | |
| 6,059,679 A | 5/2000 | Tsutsui | |
| 6,468,172 B1 | 10/2002 | Lang | |

FOREIGN PATENT DOCUMENTS

| | | | | |
|---|---|---|---|---|
| DE | 4443103 | | 6/1996 | |
| DE | 3742030 C2 | * | 6/1997 | |
| DE | 19946057 | | 3/2001 | |
| DE | 10013921 A1 | * | 9/2001 | |
| EP | 0450620 A1 | * | 10/1991 | ................. 474/135 |
| EP | 0857890 | | 8/1998 | |
| EP | 0919745 | | 6/1999 | |
| JP | 2-111538 | | 4/1990 | |
| JP | 11-133955 | | 11/1991 | |
| JP | 8-28636 | | 2/1996 | |

(Continued)

*Primary Examiner*—Marcus Charles
(74) *Attorney, Agent, or Firm*—Jordan and Hamburg LLP

(57) ABSTRACT

The boss portion of an arm is oscillatably supported with respect to a support member. A tension pulley is rotatably engaged with a tip portion of the arm. A guide plate is fixed to the axial tip portion of the support member to face the boss portion. A friction plate is sandwiched between the boss portion and the guide plate to apply an oscillational resistance to the boss portion by a spring. A vibration attenuating member is provided in the guide plate so as to control the vibration of the guide plate caused by a stick-slip phenomenon in contacting portions between the friction plate, boss portion and guide plate.

10 Claims, 8 Drawing Sheets

FOREIGN PATENT DOCUMENTS

| | | |
|---|---|---|
| JP | 2000-320628 | 11/2000 |
| JP | 2001-099250 | 4/2001 |
| JP | 2001-153196 | 6/2001 |
| JP | 2001-153198 | 6/2001 |
| JP | 2001-321698 | 7/2006 |
| WO | WO 94/25779 A1 * 11/1994 | ................. 474/135 |

* cited by examiner

F I G. 2
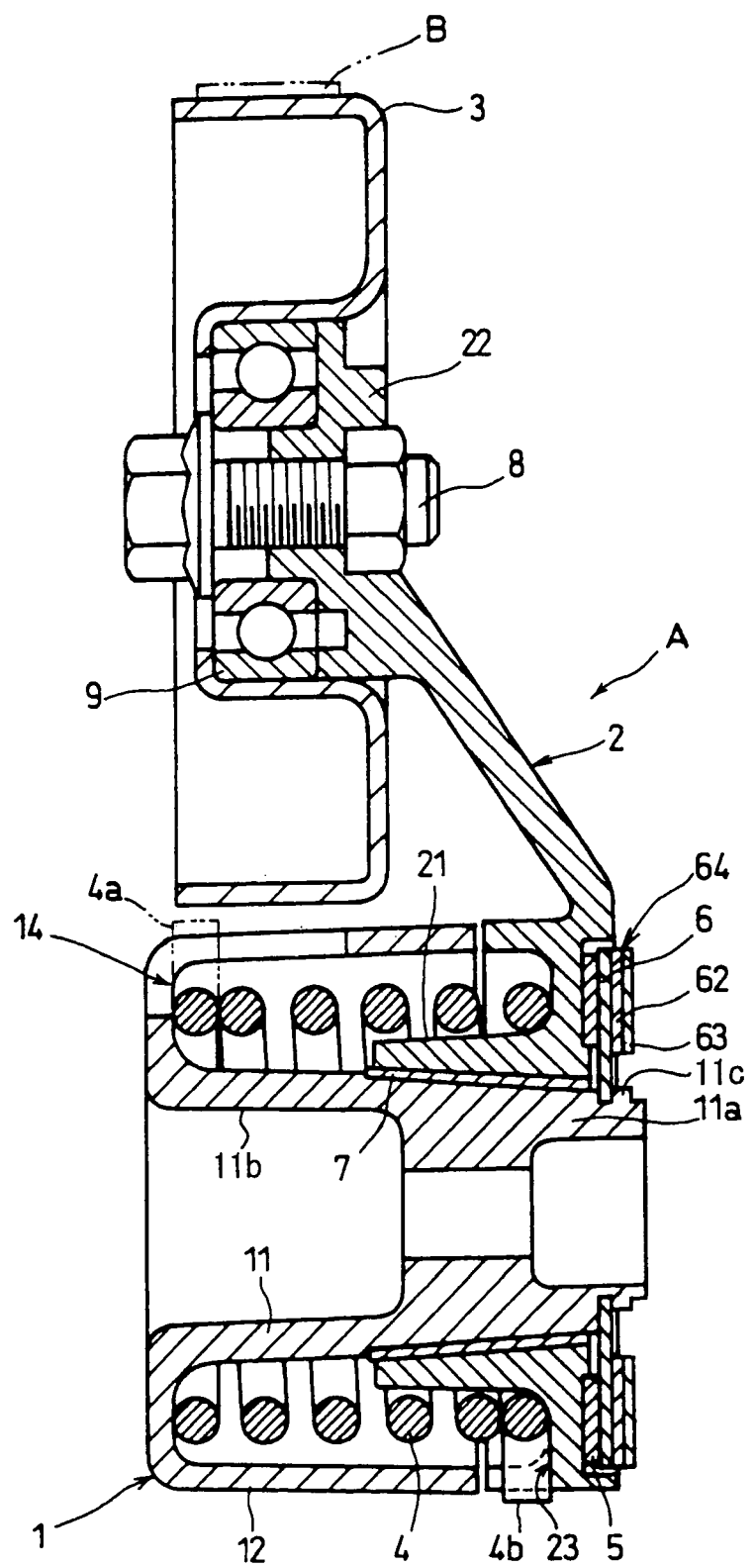

AUTO TENSIONER

TECHNICAL FIELD

The present invention relates to an auto tensioner for automatically maintaining a tensile force of the belt of a belt driving mechanism at a suitable level.

BACKGROUND TECHNIQUE

The conventional auto tensioners are of a structure having a function of regulating the movement of a tension pulley so that a vibration and impact from a belt are attenuated while allowing the movement of the tension pulley according to the tensile force of the belt generated by temperature variations in the environment, changes caused by an expansion or contraction over time, or the like.

One of such auto tensioners is disclosed in the Unexamined Published Japanese Patent Application No. H11-133955, which relates to the application by the Applicant. The auto tensioner has an arm for supporting a tension pulley. An annular friction plate is sandwiched between the end face on the front side of the boss portion of the arm and a guide plate integrally fitted to the front end of a support shaft for supporting the arm so that the extension restoring force of a helical torsion coil spring has the friction plate pressure-contact with the boss portion and the guide plate.

In the case of the foregoing type of an auto tensioner, the respective sliding portions between the friction plate, boss portion and guide plate occasionally suffer a succession of behaviors such as sticking to one another or slipping, generally termed as the stick-slip, depending on how the load from the extension restoring force of the helical torsion coil spring is imposed and the status of the movement and vibration of the tension pulley. The generation of the stick-slip phenomenon causes the guide plate made of steel plate to vibrate, which results in generation of an unusual sound or noise in the auto tensioner.

As a technique to control generation of such an unusual sound or noise in the auto tensioner, the thickness of the guide plate made of steel plate can conceivably be increased. However, materials of high rigidity such as a steel plate or the like have disadvantages of poor attenuation of a vibration and a natural resonance caused by the vibration, thereby generating a secondary noise or the like. Therefore, in terms of controlling the vibration of the guide plate due to the stick-slip and the consequent reduction of the unusual sound and noise in the auto tensioner, there can be no good results expected from merely increasing the thickness of the guide plate. Further, to increase the thickness is not preferable leading to an increased weight of the auto tensioner.

Therefore, a main object of the present invention is to provide an auto tensioner capable of reducing an unusual sound or noise generated by the vibration of the guide plate subject to the stick-slip in the sliding portions of an arm for supporting a tension pulley.

DISCLOSURE OF THE INVENTION

The present invention relates to an auto tensioner for automatically maintaining the tensile force of the belt of a belt driving mechanism at a suitable level.

According to the present invention, the boss portion of an arm is oscillatably supported with respect to a support member. A tension pulley is rotatably engaged with the tip portion of the arm. A guide plate is fixed to the axial tip portion of the support member to axially face the boss portion. A friction plate is sandwiched between the boss portion and the guide plate to apply an oscillational resistance to the boss portion. A vibration attenuating member is provided in the guide plate to enable controlling the vibration of the guide plate caused by the stick-slip phenomenon in contacting portions between the friction plate, boss portion and guide plate.

In the present invention, when the guide plate is vibrated due to the stick-slip phenomenon, the vibration is absorbed and mitigated by the vibration attenuating member provided in the guide plate.

As a preferable embodiment of the present invention, the vibration attenuating member has a structure of comprising an inner member having elasticity with respect to the outer surface of the guide plate and an outer member having less elasticity than the inner member being laminated. The inner member is arranged on the side in contact with the guide plate. When the guide plate is vibrated to the extent that the guide plate is warped to consequently generate a shear deformation between the guide plate and the outer member, the elasticity restoring force of the inner member dissolves the warping of the guide plate to restore the guide plate to its normal state.

According to the preferable embodiment, the vibration of the guide plate entails the so-called shear deformation of the elastic body, and the shear deformation serves as an absorber and mitigator of the vibration

BRIEF DESCRIPTION OF THE DRAWINGS

FIG. 2 is a sectional view taken along (2)-(2) line of FIG. 1.

THE BEST MODE FOR CARRYING OUT THE INVENTION

Figure 1:
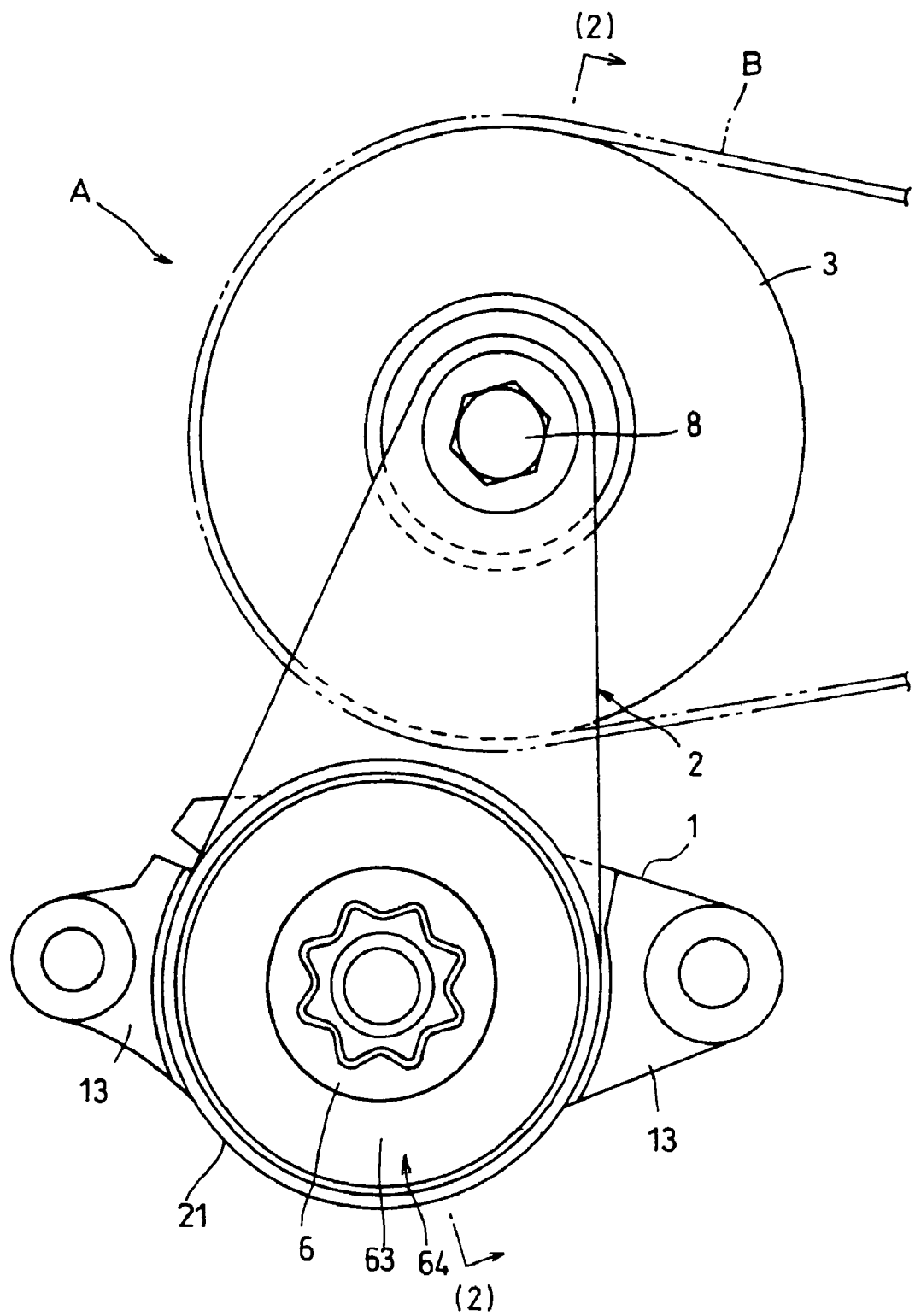
FIG. 1 is a front view of an auto tensioner according to the best mode for executing the present invention.
Figure 3:
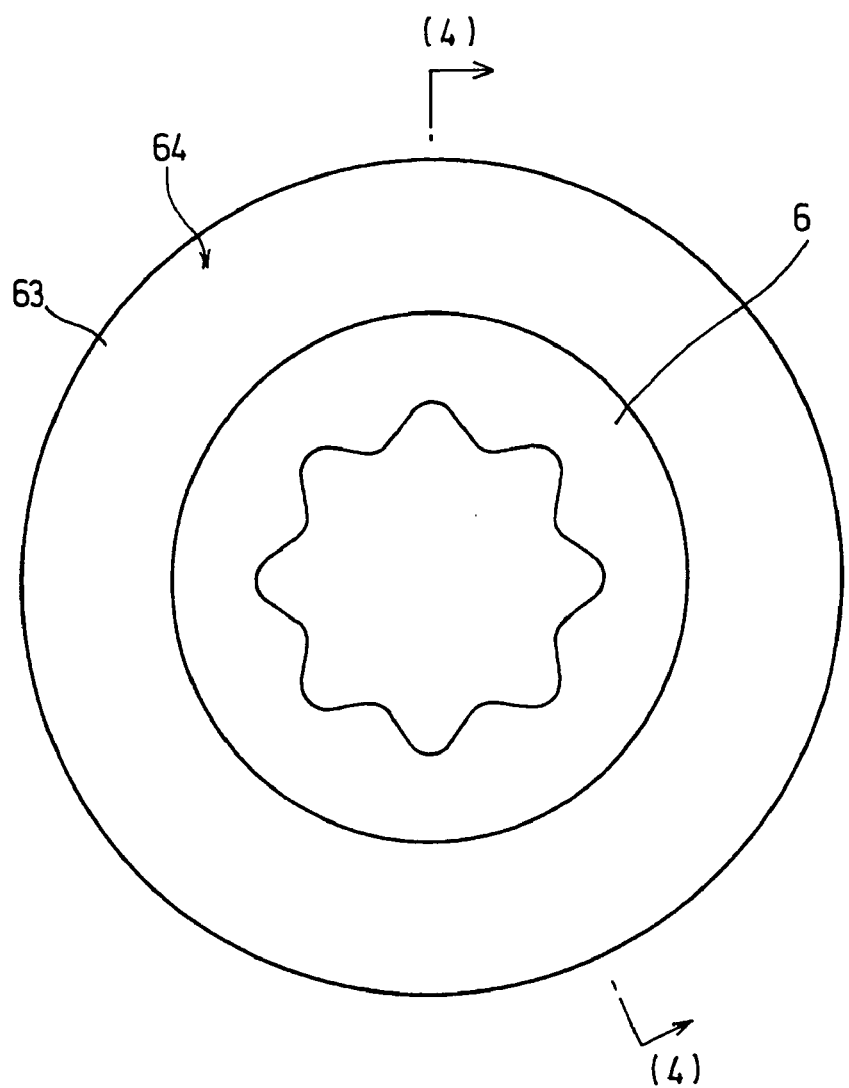
FIG. 3 is a front view of a guide plate shown in FIG. 1.
Figure 4:
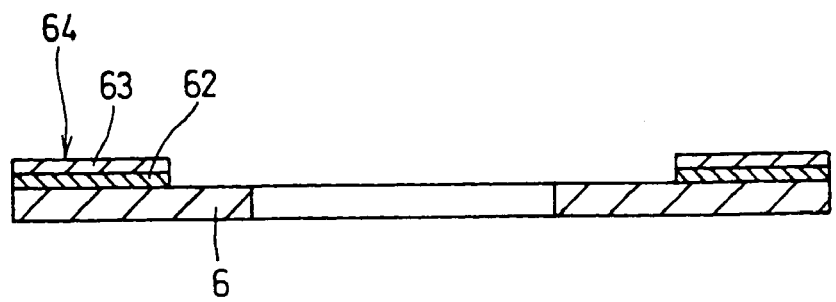
FIG. 4 is a sectional view taken along (4)-(4) line of FIG. 3.

Referring to FIGS. 1 through 9, an auto tensioner according to the best mode for executing the present invention is hereinafter described.

In these figures, an auto tensioner A comprises a support member 1, a tension arm 2, a tension pulley 3, a helical torsion coil spring 4, a friction plate 5, a guide plate 6 and a bushing 7 as a slide bearing. A belt B is wound around the outer periphery of the tension pulley 3.

The auto tensioner A, while allowing the movement of the tension pulley 3 in response to the tensile force variations of the belt B, regulates the movement of the tension pulley 3 so that the vibration and impact from the belt B are attenuated. When the tensile force of the belt B decreases by slow degrees, the arm 2 and the tension pulley 3 are tilted to the left side in FIG. 1 by the torsion restoring force of the helical torsion coil spring 4 (circumferential energizing force) so that the tensile force of the belt B is maintained at a constant level. On the other hand, when the tensile force of the belt B increases by slow degrees, the arm 2 and the tension pulley 3 are tilted to the right side in FIG. 1 against the torsion restoring force of the helical torsion coil spring 4 so that the tensile force of the belt B is maintained at a constant level.

When an intense vibration and/or impact from the belt B are inflicted on the auto tensioner A, the vibration and/or impact are transmitted to a boss portion 21 of the arm 2 which supports the tension pulley 3. In such a case, the outer surface of the boss portion 21 of the arm 2 is directly pressed against the inner surface of the friction plate 5 by the extension restoring force of the helical torsion coil spring 4 (axial energizing force) to result in generation of a frictional resistance. Accordingly, the vibration and impact from the belt B are absorbed and attenuated by the frictional resistance, which controls any unnecessary oscillation of the arm 2. As a result, the position of the tension pulley 3 is no longer subject to substantial changes, which thereby enables maintaining the tension with respect to the belt B at a constant level.

The respective elements of the auto tensioner A are hereinafter described.

The support member 1 is bolt-fixed to a mounting object in which a belt driving mechanism not shown is provided. The support member 1 comprises an arm support portion 11, an external cylindrical portion 12 and a bolt-mounting piece 13. The arm support portion 11 has a half portion on the tip side thereof and another half portion on the base end side thereof in the axial direction. The tip-side half portion constitutes a structure of a support shaft portion 11*a* having an outer peripheral surface in frustum shape, and the base end-side half portion constitutes a structure of an internal cylindrical portion 11*b* of cylindrical shape. The support shaft portion 11*a* has a receipt portion of substantially star shape in section having a tip portion, into which the guide plate 6 is inserted to be fitted thereto. The external cylindrical portion 12 is formed so as to extend radially outward from the internal cylindrical portion 11*b* of the arm support portion 11 and further extend to the free end side so that the outer periphery of the arm support portion 11 is thereby surrounded. The bolt mounting piece 13 is formed on the outer periphery of the external cylindrical portion 12 so as to protrude radially outward. The support member 1 is manufactured by die-casting using aluminum alloy and such. The shape of the outer peripheral surface of the arm support portion 11 corresponds to the draft angle of a casting die used.

The arm 2 is oscillatably fitted to the support shaft portion 11*a* of the arm support portion 11 of the support member 1 to be thereby supported. The arm 2 has the boss portion 21 of cylindrical shape formed on the base end portion thereof and a pulley support portion 22 on the idle end portion thereof. The boss portion 21 of the arm 2 is oscillatably fitted around the outer periphery of the support shaft portion 11*a* of the arm support portion 11 via the bushing 7. The pulley support portion 22 of the arm 2 is provided so as to protrude in the same direction as the boss portion 21 protrudes. The arm 2 is, as is the case with the support member 1, manufactured by die-casting using aluminum alloy.

The tension pulley 3, which is manufactured by the sheet metal press working step, is journaled in the pulley support portion 22 of the arm 2 via a rolling bearing 9 so as to freely rotate. The tension pulley 3 is mounted to the pulley support portion 22 of the arm 2 by means of bolts 8.

The helical torsion coil spring 4 is disposed in an annular space formed by the respective outer peripheral surfaces of the arm support portion 11 of the support member 1 and the boss portion 21 of the arm 2 and the inner peripheral surface of the external cylindrical portion 12 of the support member 1 in the state of being torsion-compressed with no contact with the respective surfaces. The helical torsion coil spring 4, using the torsion restoring force thereof, energizes the arm 2 in a certain direction (counter-clockwise in FIG. 1). Also, the helical torsion coil spring 4, using the axial extension restoring force thereof, presses the outer surface of the boss portion 21 of the arm 2 to the inner surface of the friction plate 5 to apply a frictional resistance to the boss portion 21. On the both ends of the helical torsion coil spring 4 are integrally provided bent portions 4*a* and 4*b* which are bent radially outward. The bent portions 4*a* and 4*b* are respectively engaged with a slit-shaped cutout 14 provided in the bottom portion of the support member 1 and a slit-shaped cutout 23 provided in the boss portion 21 of the arm 2.

The friction plate 5 is provided in the state of being sandwiched between the boss portion 21 of the arm 2 and the guide plate 6 fixed to the support shaft portion 11*a* of the support member 1 at relatively near the tip portion thereof. The friction plate 5 is pressed against the boss portion 21 and the guide plate 6 by a required pressure according to the extension restoring force of the helical torsion coil spring 4 so that an oscillational resistance is applied to the boss portion 21 of the arm 2. The friction plate 5 is made of, for example, a polyamide resin material such as polyester ether ketone (PEEK), a clutch facing material, a brake lining material or a brake pad material.

The guide plate 6 has a through opening of substantially star shape in front view conforming to the sectional shape of the tip portion of the support shaft portion 11*a*, which is fittably inserted into the tip portion of the support shaft portion 11*a*. The inner peripheral portion of the guide plate 6 is integrally fixed to the support shaft portion 11*a* by a caulked portion 11*c* of the support shaft portion 11*a*.

The bushing 7, which is formed in frustum shape, is interposed in an engagement portion between the outer peripheral surface of the support shaft portion 11*a* of the support member 1 and the inner peripheral surface of the boss portion 21 of the arm 2. As a material used for the bushing 7, for example, a sintering metallic material, or engineering plastics such as polyamide 46 (product called 46 nylon) or polyether sulfone (PES) can be employed.

When the auto tensioner A is used, there is a concern that the foregoing stick-slip phenomenon occurs in the respective sliding portions between the friction plate 5, boss portion 21 and guide plate 6 depending on the environment, which results in a vibration and noise. In the present invention the tranquility of the auto tensioner A is secured by controlling the vibration of the guide plate 6.

In the present invention, an annular vibration attenuating member 64 is provided on the outer surface of the guide plate 6. The vibration attenuating member 64 has a structure of an annular elastic body 62, as an inner member, having elasticity and made of resin or such, and an annular plate 63, as an outer member, made of metal such as a steel material being laminated. The annular plate 63 is provided on the outer surface of the guide plate 6 using the annular elastic body 62 as an adhesive. The degree of the elasticity of the annular elastic body 62 is only required to be larger than that of the annular plate 63, therefore it may not necessarily be the only option that the annular elastic body 62 is made of resin and the annular plate 63 is made of metal.

When the vibration attenuating member is provided, with regard to that the inner peripheral portion of the guide plate 6 is caulked on the tip portion of the support shaft portion 11a, the inner diameter of the vibration attenuating member 64 is set to a value larger than the outer diameter of a caulked portion 11c, and the shape thereof constitutes a circular shape in front view.

Hereinafter is explained how the vibration attenuating member 64 can effectively insulate a noise and control a vibration which can be generated on the guide plate 6.

Figure 5:
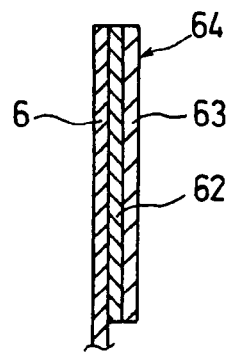
FIG. 5 is an explanatory view of main portions shown in FIG. 4.
Figure 6:
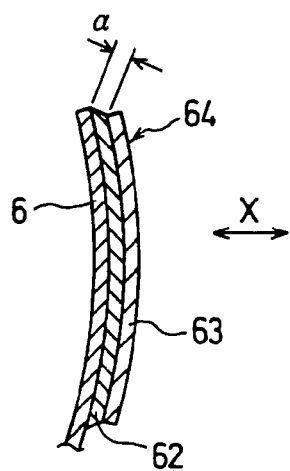
FIG. 6 is an explanatory view of the status of a shear deformation $\alpha$ generated in the main portions shown in FIG. 4.
Figure 7:
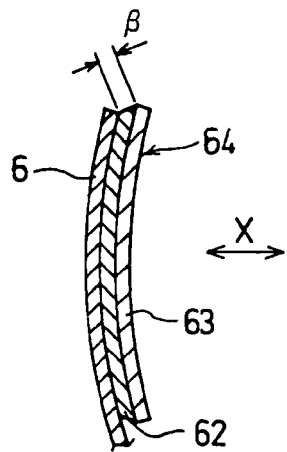
FIG. 7 is an explanatory view of the status of a shear deformation $\beta$ generated in the main portions shown in FIG. 4.

Referring to FIGS. 5 through 7, when the stick-slip phenomenon occurs on the guide plate 6 in the state as shown in FIG. 5, the guide plate 6, as shown in FIGS. 6 and 7, vibrates in both directions of X. When the vibration of the guide plate 6 is very small, the vibration is attenuated by only the elastic property of the annular elastic body 62. When the vibration of the guide plate 6 is large, the guide plate 6, as shown in FIGS. 6 and 7, warps in both directions of X according to the vibration. This warping causes, in the outer and inner peripheral sides of the annular elastic body respectively in contact with the guide plate 6 and the annular plate 63, a shear deformation $\alpha$ in FIG. 6, and a shear deformation $\beta$ in FIG. 7 are generated to leave the annular elastic body 62 strained. In the case of such a shear deformation, the elasticity restoring force of the annular elastic body 62 serves in the manner the warping can be dissolved so that the vibration amplitude of the guide plate 6 is controlled. Such a vibration control phenomenon can control the vibration and noise caused in the auto tensioner A.

As a suitable material for the guide plate 6 and the annular plate 63, for example, steel materials such as SECC, SPCC, S55C or the like conforming to Japan Industrial Standard can be used. When the guide plate 6 and the annular plate 63 are changed in respective thicknesses, in respective materials used or the like so that different degrees of hardness can be respectively set, a larger vibration control effect can be achieved.

Figure 8:
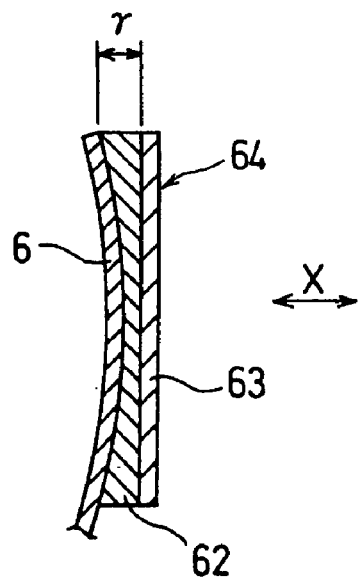
FIG. 8 is an explanatory view of the status of a shear deformation $\gamma$ generated in the main portions shown in FIG. 4.
Figure 9:
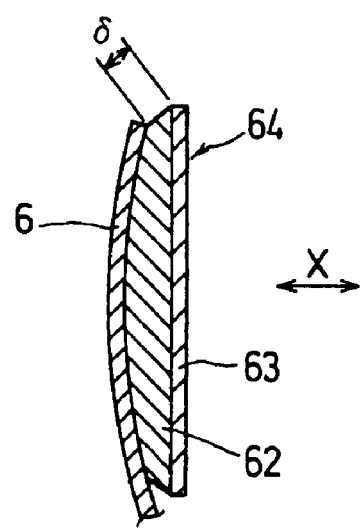
FIG. 9 is an explanatory view of the status of a shear deformation $\delta$ generated in the main portions shown in FIG. 4.

More specifically, when the hardness of the annular plate 63 is, for example, set to a higher value than that of the guide plate 6, as shown in FIGS. 8 and 9, the foregoing shear deformations $\gamma$ and $\delta$ of the annular elastic body 62 become larger, while the annular plate 63 is less easily deformed, the deformational resistance of the annular elastic body 62 can be more effectively leveraged to contribute to improvement of the vibration control performance.

As a suitable material for the annular elastic body 62, for example, epoxy resin or acrylic-based resin or the like can be used. The annular elastic body 62, even when processed to be as thin as a film for the purpose of reducing the axial dimension thereof, can achieve a sufficient level of vibration control effect. However, it is preferable to have the annular elastic body 62 thick because the vibration control effect can be thereby enhanced and reduction in weight can be realized than by thickening the steel-made guide plate 6 and annular plate 63.

The present invention is not restricted to the described mode for carrying out the invention. Different applications and modifications are open for consideration.

Figure 10:
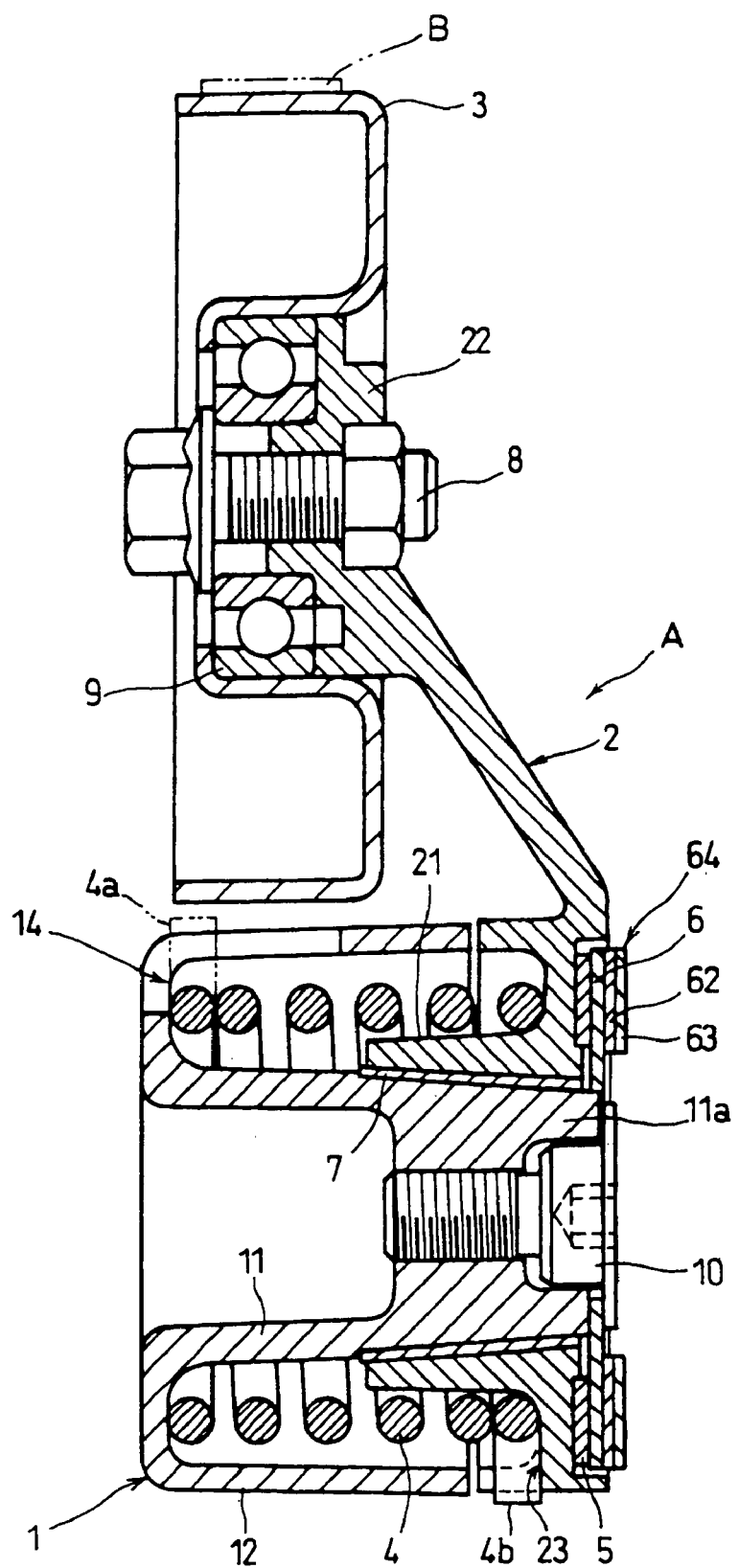
FIG. 10 is a sectional view of an auto tensioner according to another mode for executing the present invention.

1. As shown in FIG. 10, the guide plate 6 may be fixed, in a sandwiched state, to the outer surface of the support shaft portion 11a of the support member 1 by means of bolts 10.

Figure 11:
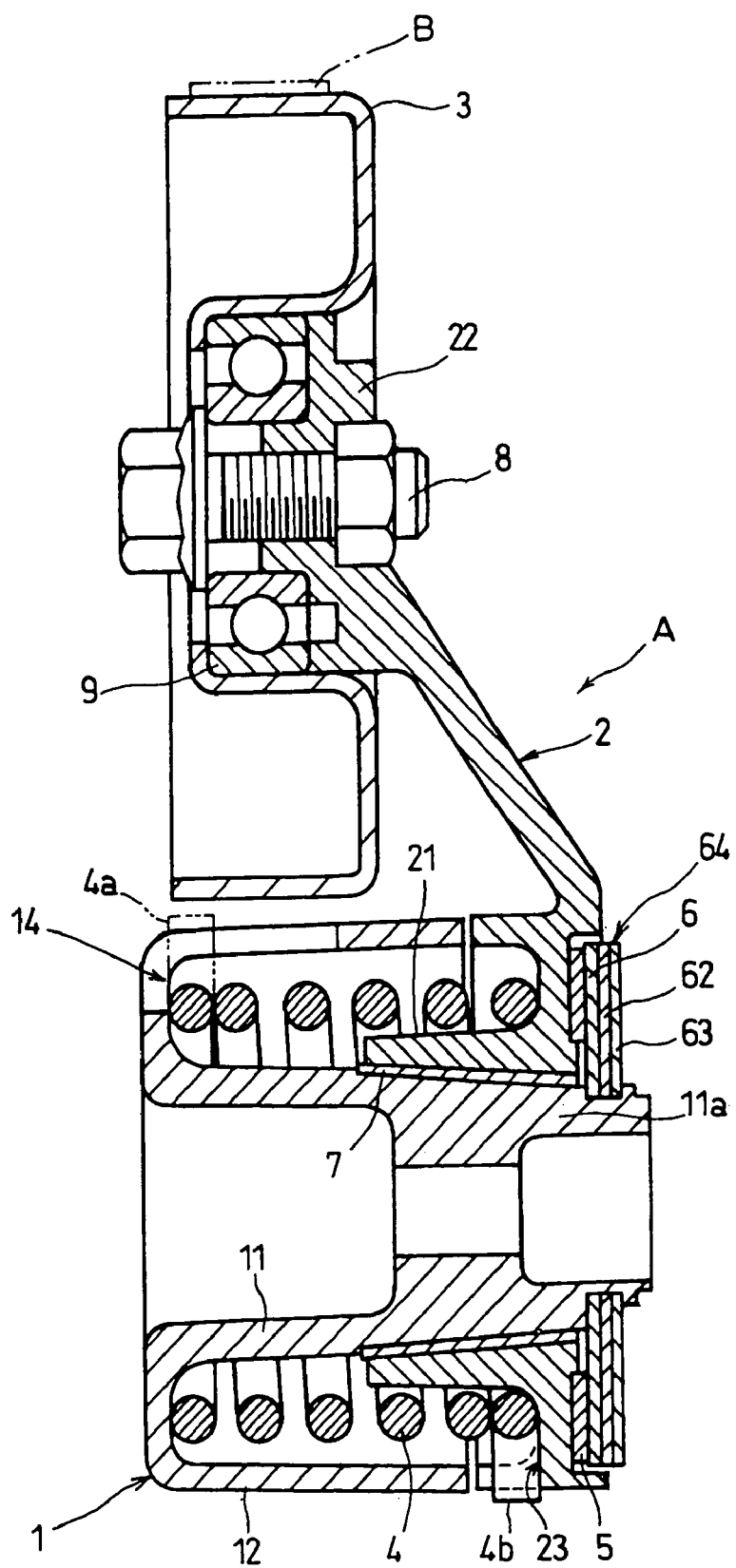
FIG. 11 is a sectional view of an auto tensioner according to still another mode for executing the present invention.
Figure 12:
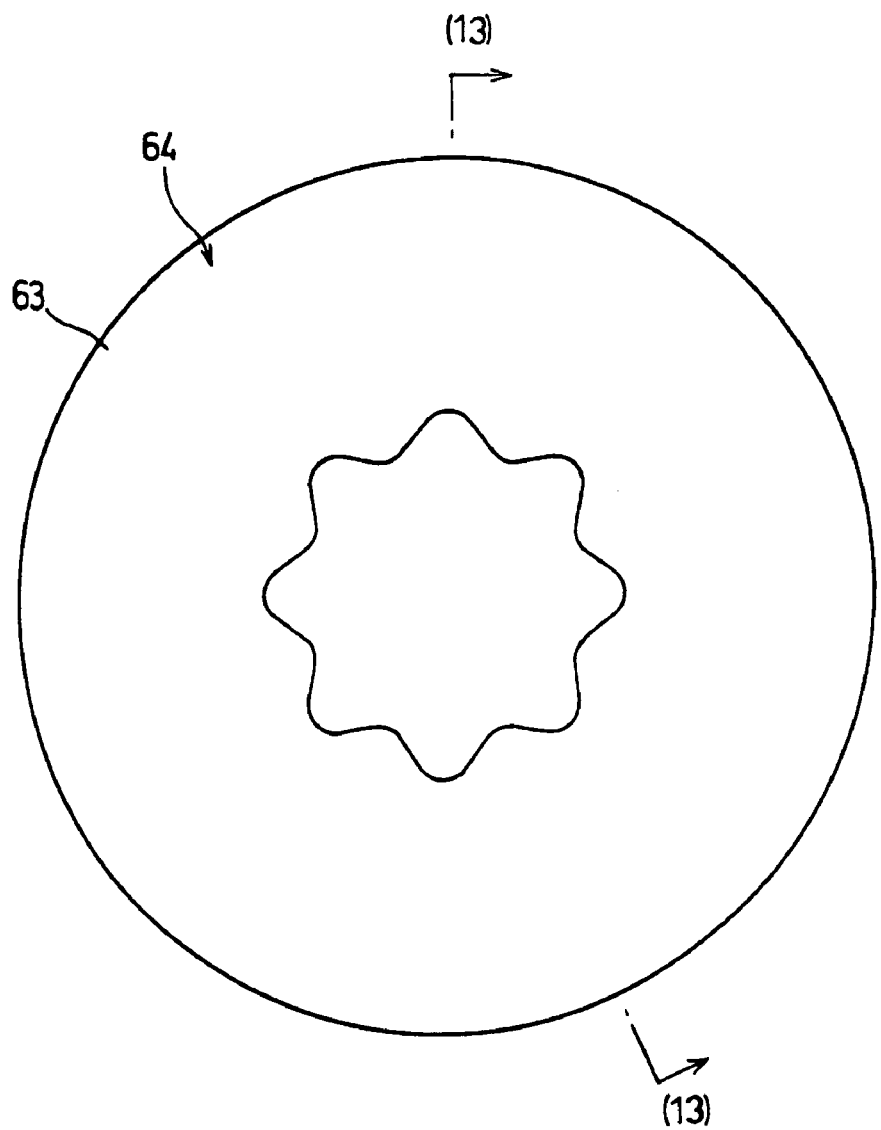
FIG. 12 is a front view of the guide plate shown in FIG. 11.
Figure 13:
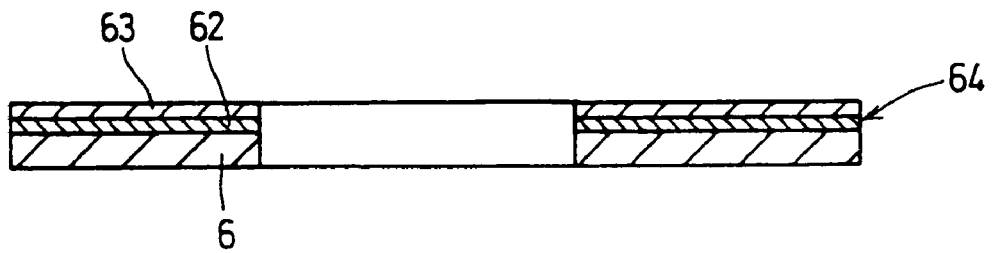
FIG. 13 is a view taken along (13)-(13) line of FIG. 12.

2. As shown in FIGS. 11 through 13, the shape of the inner diameter portion of the vibration attenuating member 64 may be arranged to be identical with the shape of the inner diameter portion of the guide plate 6 so that the guide plate 6 and the vibration attenuating member 64 are collectively fixed, in a sandwiched state, to the tip portion of the support shaft portion 11a of the support member 1. The guide plate 6 per se may be manufactured from a single plate material having adopted a structure of a resin plate being sandwiched by two steel plates, which is fixed, in an intact state, to the tip portion of the support shaft portion 11a in a sandwiched state.

3. The vibration attenuating member 64 may be provided on the reverse surface of the guide plate 6, that is the surface abutting the friction plate 5.

In the auto tensioner described thus far, the vibration attenuating member is provided in the guide plate so that the vibration attenuating member absorbs and mitigates the vibration of the guide plate, which is caused by the stick-slip in the sliding portions of the arm for supporting the tension pulley, to consequently enable controlling the vibration and noise generated in the entire auto tensioner. In particular, the present invention allows the so-called shear deformation to be generated on the elastic body according to the vibration of the guide plate, and the shear deformation, as a result, absorbs and mitigates the vibration of the guide plate. Therefore, the present invention is preferable in that the simple structure enables enhancing the vibration control effect of the vibration attenuating member.

POSSIBILITY OF INDUSTRIAL APPLICATION

The present invention can be applied to an auto tensioner for automatically maintaining a tensile force of the belt of a belt driving mechanism at a suitable level.

The invention claimed is:

1. An auto tensioner for automatically maintaining a tensile force of a belt of a belt driving mechanism at a suitable level, comprising:
    a support member fixed to a mounting object in which the belt driving mechanism is provided;
    an arm having a boss portion on a base end portion thereof oscillatably supported with respect to the support member;
    a tension pulley rotatably engaged with the arm at a tip side thereof;
    a guide plate fixed to an axial tip portion of the support member to axially face the boss portion;
    a spring oscillatably energizing the arm around the support member in a certain direction and pressing the boss portion against the guide plate;
    a friction plate sandwiched between the boss portion of the arm and the guide plate and pressed against the boss portion and the guide plate by the spring to apply an oscillational resistance to the boss portion; and
    a vibration attenuating member provided in contact with an outer surface of the guide plate for controlling vibration of the guide plate caused by a stick-slip phenomenon during sliding contact between portions of the friction plate, the boss portion and the guide plate; wherein the vibration attenuating member has a structure of an inner member having a required elasticity and an outer member having less elasticity than the inner member and being laminated to the inner member, the inner member is located on a side in contact with the outer surface of the guide plate, and when the guide plate is vibrated to the extent that the guide plate is warped to consequently generate a sheer deformation between the guide plate and the outer member, an elasticity restoring force of the inner member nullifies the warping of the guide plate.

2. The auto tensioner according to claim 1, wherein the guide plate and the outer member are both made of metal, and a hardness of the outer member is set to a value higher than that of a hardness of the guide plate.

3. The auto tensioner according to claim 1, wherein the inner member is made of epoxy resin or acrylic-based resin.

4. The auto tensioner according to claim 1, wherein the guide plate is caulked to be fixed with respect to the axial tip portion of the support member.

5. The auto tensioner according to claim 1, wherein the guide plate is bolt-fixed with respect to the axial tip portion of the support member.

6. An auto tensioner for automatically maintaining a tensile force of a belt of a belt driving mechanism at a suitable level, comprising:

a support member fixed to a mounting object in which the belt driving mechanism is provided, and having an arm support portion and a support shaft portion of cylindrical shape on a tip side of the arm support portion, an arm having a boss portion of cylindrical shape on a base end side thereof and a pulley support portion on an idle end side thereof, the boss portion of cylindrical shape being oscillatably fitted to the support shaft portion of the arm support portion to be thereby supported;

a tension pulley rotatably engaged with the pulley support portion of the arm;

an annular guide plate fixed to the support shaft portion of the arm support portion and having an inner surface axially facing an outer surface of the boss portion;

a spring oscillatably energizing the arm around the support shaft portion in a certain direction and pressing the boss portion against the guide plate side;

an annular friction plate sandwiched between the outer surface of the boss portion of the arm and inner surface of the guide plate and pressed against the boss portion and the guide plate by the spring to apply an oscillational resistance to the boss portion; and a vibration attenuating member provided on an outer surface of the guide plate for controlling vibration of the guide plate caused by a stick-slip phenomenon during sliding contact between portions of the friction plate, the boss portion and the guide plate, wherein the vibration attenuating member has a structure of an annular inner member having elasticity and an annular outer member having less elasticity than the inner member and being laminated to the inner member, an inner surface of the inner member is located on a side in contact with an outer surface of the guide plate, and when the guide plate is vibrated to the extent that the guide plate is warped to consequently generate a shear deformation between the guide plate and the outer member, an elasticity restoring force of the inner member nullifies the warping of the guide.

7. The auto tensioner according to claim 6, wherein the guide plate and the outer member are both made of metal, and a hardness of the outer member is set to a value higher than a hardness of the guide plate.

8. The auto tensioner according to claim 7, wherein the inner member is made of epoxy resin or acrylic-based resin.

9. The auto tensioner according to claim 6, wherein an inner diameter of the vibration attenuating member is set to a value higher than a largest inner diameter of the guide plate.

10. The auto tensioner according to claim 6, wherein an inner diameter of the vibration attenuating member is identical with an inner diameter of the guide plate, and the guide plate and the vibration attenuating member are both fixed to an inner peripheral surface of the support shaft portion of the support member.

* * * * *